(12) United States Patent
Sakurai et al.

(10) Patent No.: US 10,135,101 B2
(45) Date of Patent: Nov. 20, 2018

(54) POWER STORAGE MODULE

(71) Applicant: HONDA MOTOR CO., LTD., Tokyo (JP)

(72) Inventors: Atsushi Sakurai, Wako (JP); Masao Kawata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 56 days.

(21) Appl. No.: 14/996,230

(22) Filed: Jan. 15, 2016

(65) Prior Publication Data

US 2016/0240835 A1 Aug. 18, 2016

(30) Foreign Application Priority Data

Feb. 18, 2015 (JP) ................................. 2015-029162

(51) Int. Cl.
| | |
|---|---|
| *H01M 10/625* | (2014.01) |
| *H01M 2/10* | (2006.01) |
| *H01M 10/48* | (2006.01) |
| *H01M 10/6561* | (2014.01) |
| *H01M 10/613* | (2014.01) |
| *H01M 10/0525* | (2010.01) |

(52) U.S. Cl.
CPC ....... *H01M 10/625* (2015.04); *H01M 2/1077* (2013.01); *H01M 10/486* (2013.01); *H01M 10/613* (2015.04); *H01M 10/6561* (2015.04); *H01M 10/0525* (2013.01); *H01M 2220/20* (2013.01); *Y02E 60/122* (2013.01)

(58) Field of Classification Search
None
See application file for complete search history.

(56) References Cited

U.S. PATENT DOCUMENTS

| | | | | |
|---|---|---|---|---|
| 5,011,424 A | * | 4/1991 | Simmons ........... | H01R 13/6275 439/352 |
| 2006/0216991 A1 | * | 9/2006 | Boutros ............. | H01R 13/6275 439/358 |

(Continued)

FOREIGN PATENT DOCUMENTS

JP 2012-256467 12/2012

*Primary Examiner* — Wojciech Haske
(74) *Attorney, Agent, or Firm* — Mori & Ward, LLP

(57) ABSTRACT

A power storage module includes storage batteries, separators, a temperature measuring component, and a temperature measuring component holder. Each of the storage batteries includes a terminal surface, a positive terminal, and a negative terminal. The positive terminal and the negative terminal are provided on the terminal surface. The temperature measuring component is to measure a temperature of a measured storage battery among the storage batteries. The temperature measuring component holder is provided on a terminal surface side of the measured storage battery between the positive terminal and the negative terminal of the measured storage battery to hold the temperature measuring component. The temperature measuring component holder includes a temperature measuring component guide via which the temperature measuring component is inserted into the temperature measuring component holder in a direction from the positive terminal toward the negative terminal or in a direction from the negative terminal toward the positive terminal.

26 Claims, 6 Drawing Sheets

(56) References Cited

U.S. PATENT DOCUMENTS

| | | | |
|---|---|---|---|
| 2013/0288086 A1* | 10/2013 | Kim | H01M 2/34 429/61 |
| 2013/0309553 A1* | 11/2013 | Kinoshita | H01M 2/1077 429/158 |
| 2013/0323552 A1* | 12/2013 | Kurita | H01M 6/5038 429/90 |
| 2014/0014420 A1* | 1/2014 | Nakamura | H01M 2/1077 180/65.1 |
| 2015/0079437 A1* | 3/2015 | Jeong | H01M 2/1077 429/90 |

* cited by examiner

POWER STORAGE MODULE

CROSS-REFERENCE TO RELATED APPLICATIONS

The present application claims priority under 35 U.S.C. § 119 to Japanese Patent Application No. 2015-029162, filed Feb. 18, 2015, entitled "Power Storage Module." The contents of this application are incorporated herein by reference in their entirety.

BACKGROUND

1. Field

The present disclosure relates to a power storage module.

2. Description of the Related Art

Generally, a power storage module in which a plurality of storage batteries (battery cells) are stacked is known. The above power storage module is mounted in a hybrid vehicle or a motor-driven vehicle such as an EV, for example.

In a power storage module, output control and temperature control are performed on the basis of the temperature of the storage battery. Temperature control is required because the storage battery easily deteriorates at a high temperature. For example, a battery module disclosed in Japanese Unexamined Patent Application Publication No. 2012-256467 is known.

In the above battery module, holders are held between the battery cells. Furthermore, thermistor holding portions that hold a thermistor in a holder are provided at positions that face the bottom surfaces of the battery cells.

Accordingly, a cooling medium that flows in from one side of a pair of lateral surfaces of the battery cell, and that flows out from the other side of the pair of lateral surfaces after flowing along a main cooling surface do not easily interfere the thermistor holding portions of the holder. With the above, the leak amount of the cooling medium from the thermistor holding portion can be prevented from varying depending on whether there is a thermistor or not and the cooling state of the battery cells can be made uniform such that the life of the battery cells can be extended.

SUMMARY

According to one aspect of the present invention, a power storage module includes storage batteries, separators, a temperature measuring component, and temperature measuring component holding portions. The separators are stacked alternately with the storage batteries. The temperature measuring component measures a temperature of a storage battery of the storage batteries. The temperature measuring component is mounted on a temperature measuring component holding portion of the temperature measuring component holding portions. The storage batteries include terminal surfaces, each terminal surface provided with a positive terminal and a negative terminal. The temperature measuring component holding portion is provided on a terminal surface side between the positive terminal and the negative terminal of the storage battery. A temperature measuring component guide mechanism is further provided that sets an insertion direction of the temperature measuring component to a direction oriented towards the negative terminal from the positive terminal or a direction oriented towards the positive terminal from the negative terminal.

According to another aspect of the present invention, a power storage module includes storage batteries, separators, a temperature measuring component, and a temperature measuring component holder. The storage batteries are stacked in a stacking direction. Each of the storage batteries includes a terminal surface, a positive terminal, and a negative terminal. The positive terminal and the negative terminal are provided on the terminal surface. The separators are stacked alternately with the storage batteries in the stacking direction. The temperature measuring component is to measure a temperature of a measured storage battery among the storage batteries. The temperature measuring component holder is provided on a terminal surface side of the measured storage battery between the positive terminal and the negative terminal of the measured storage battery to hold the temperature measuring component. The temperature measuring component holder includes a temperature measuring component guide via which the temperature measuring component is inserted into the temperature measuring component holder in a direction from the positive terminal toward the negative terminal or in a direction from the negative terminal toward the positive terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
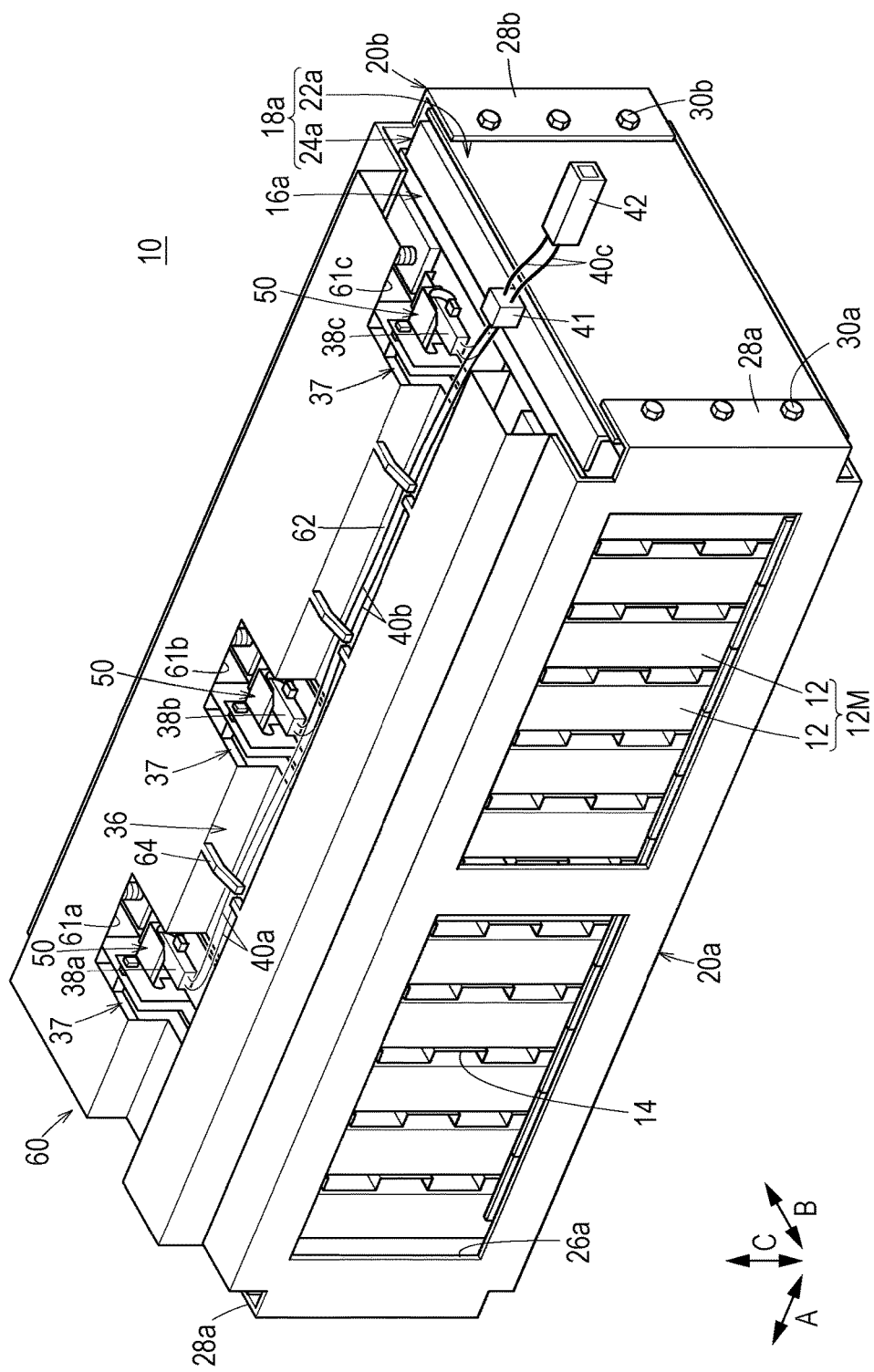
FIG. 1 is a schematic perspective view for describing a power storage module according to a first exemplary embodiment of the present disclosure.

The embodiments will now be described with reference to the accompanying drawings, wherein like reference numerals designate corresponding or identical elements throughout the various drawings.

Figure 2:
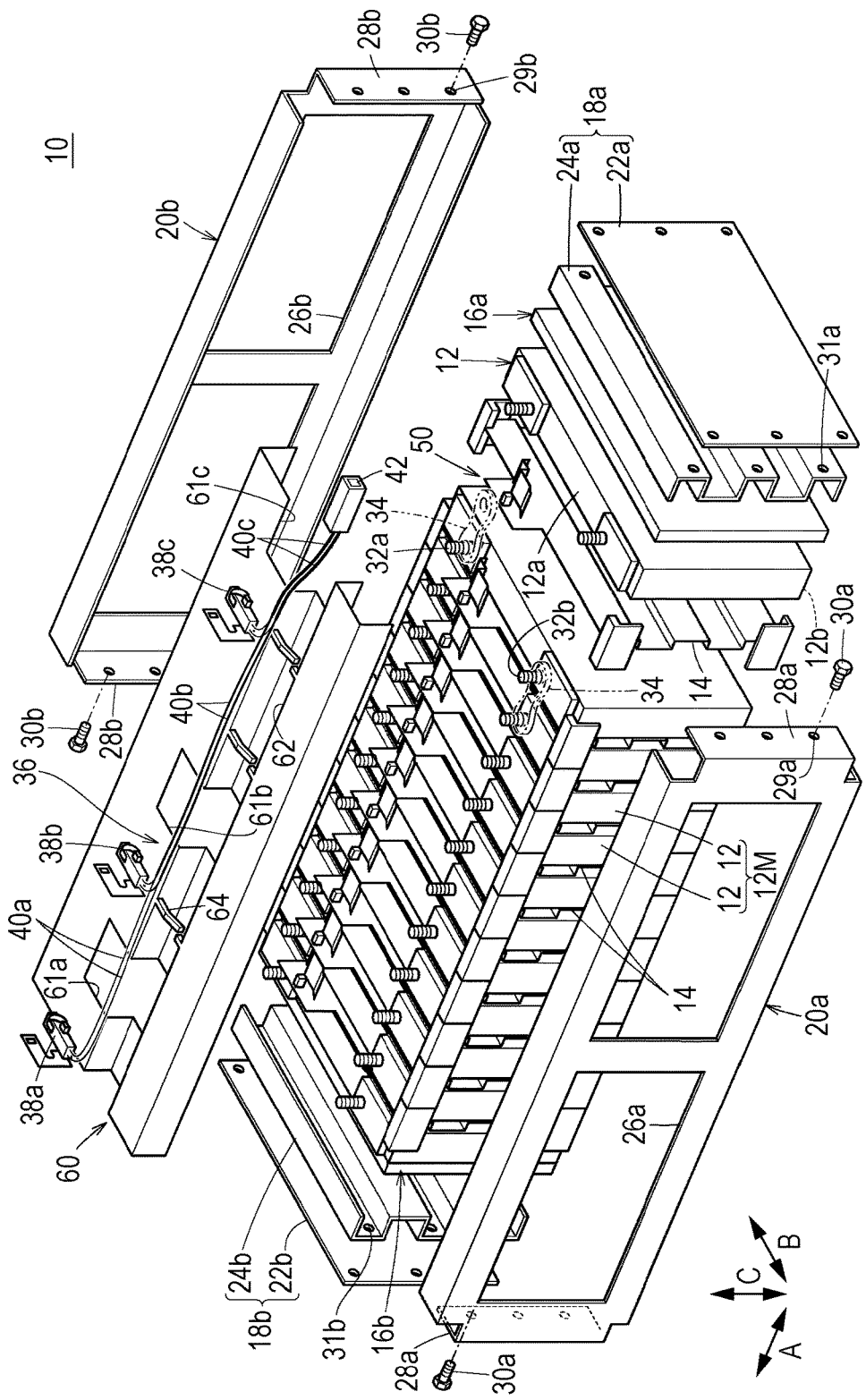
FIG. 2 is an exploded perspective view for describing essential portions of the power storage module.

As illustrated in FIGS. 1 and 2, a power storage module 10 according to a first exemplary embodiment of the present disclosure is, for example, mounted in a hybrid car or a motor-driven vehicle such as an EV (not shown). The power storage module 10 includes a storage battery bank (a battery module) 12M in which a plurality of storage batteries (battery cells) 12 are stacked in the horizontal direction (an arrow A direction). The storage batteries 12 each have a rectangular shape and, while being disposed in an upright position, are stacked alternately in the arrow A direction with separators (holders) 14 having an insulation property.

As illustrated in FIG. 2, rectangular (or square) end plates 18a and 18b are disposed at both ends of the storage battery bank 12M in the stacking direction while having insulator plates (or may be separators 14) 16a and 16b having an adiabatic function and an insulating function interposed therebetween. The end plates 18a and 18b are connected to each other with, for example, a pair of connection bars 20a and 20b that are disposed at both ends in an arrow B direction and that extend in the arrow A direction (see FIGS. 1 and 2).

The end plate 18a includes two metal plates, namely, an outer metal plate 22a and an inner metal plate 24a (see FIG. 2). The outer metal plate 22a and the inner metal plate 24a are integrated by welding, for example. The end plate 18b includes two metal plates, namely, an outer metal plate 22b and an inner metal plate 24b. The outer metal plate 22b and the inner metal plate 24b are integrated by welding, for example. The inner metal plates 24a and 24b each have a corrugated plate shape.

The connection bar 20a is formed of a laterally long sheet metal (a metal plate) and, for example, openings 26a for introducing a coolant for cooling the storage batteries 12 are formed therein. The connection bar 20a extends in the stacking direction of the storage battery bank 12M and is provided with bended end portions 28a at both ends in the stacking direction.

Each bended end portions 28a extend in a principal surface direction (an arrow B direction) of the end plates 18a and 18b and include hole portions 29a that are arranged vertically with respect to each other. Screws 30a being screwed into screw holes 31a and 31b of the end plates 18a and 18b through the hole portions 29a fixes the connection bar 20a to the end plates 18a and 18b.

The connection bar 20b is configured in a similar manner to the configuration of the connection bar 20a described above; accordingly, the same components are attached with the same reference numerals while reference signs b are attached in place of reference signs a and detailed description of the components is omitted.

Each storage battery 12 is, for example, a lithium-ion battery and has a rectangular (or a square) shape. A positive (or a negative) terminal 32a and a negative (or a positive) terminal 32b are provided on a terminal surface 12a, which is an upper surface, of each of the storage batteries 12. Each of the positive terminal 32a and the negative terminal 32b of the storage batteries 12 that are adjacent to each other are connected with a bus bar 34.

Figure 3:
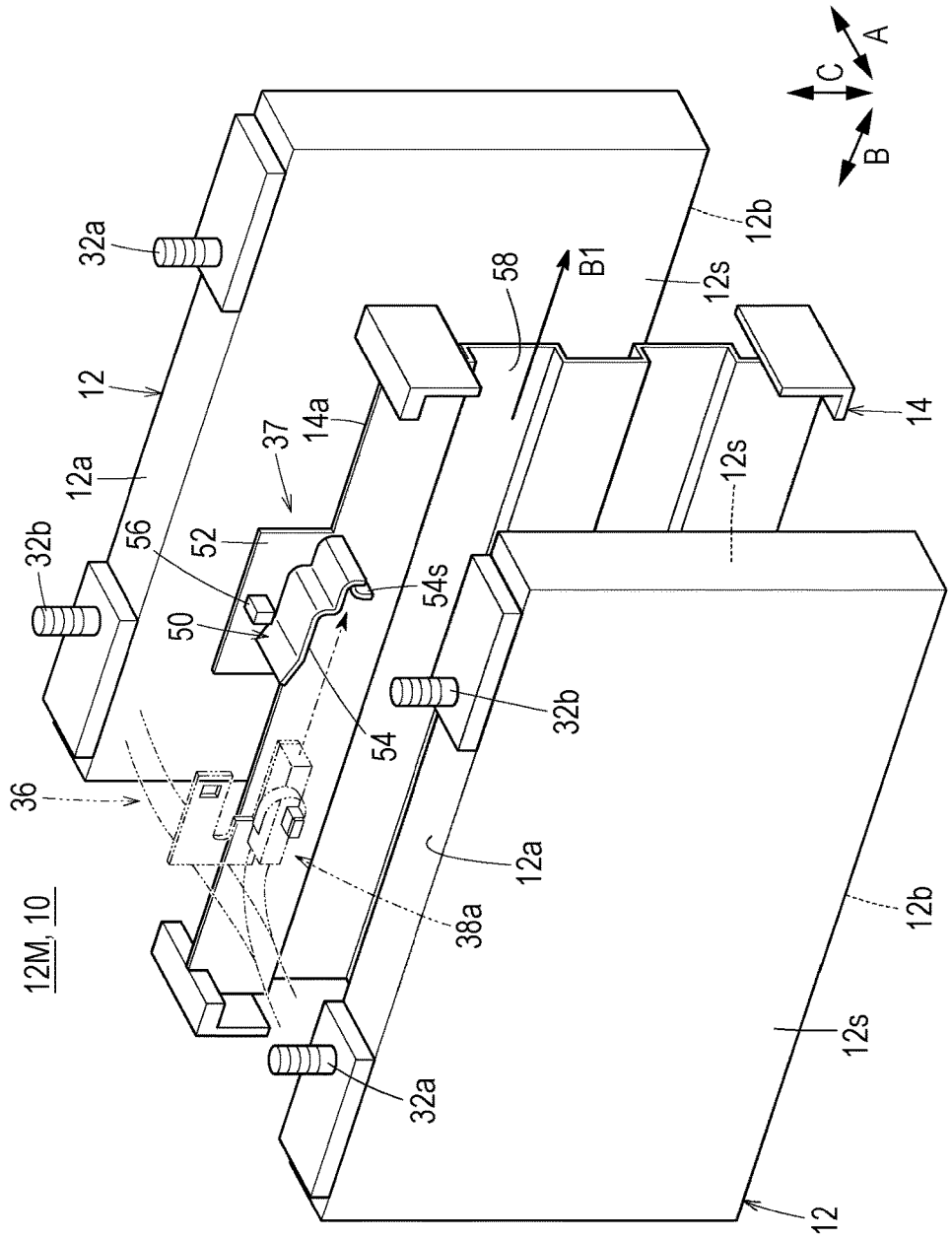
FIG. 3 is a perspective view for describing storage batteries and a separator constituting the power storage module.

As illustrated in FIG. 3, by bending a thin resin plate into a wave-like form, each separator 14 is bent and formed in a waveform extending in the up-down direction (an arrow C direction) in side view. Temperature measuring component holding portions (temperature measuring component holders) 37 on which a temperature measuring component such as, for example, a thermistor 36, that measures the temperature of the storage batteries 12 is mounted are provided on the upper surfaces 14a of the separators 14, in other words, on the terminal surfaces 12a side of the storage batteries 12.

As illustrated in FIGS. 1 and 2, the thermistor 36 is provided with a plurality of, for example, three, thermistor elements 38a, 38b, and 38c. Pairs of harnesses 40a, 40b, and 40c are connected to the thermistor elements 38a, 38b, and 38c, respectively, and the harnesses 40a, 40b, and 40c are integrally connected to a connector 42. The lengths of the harnesses 40a, 40b, and 40c are set according to the attaching position of the thermistor elements 38a, 38b, and 38c. The harnesses 40a, 40b, and 40c are held on the end plate 18a side through a fixed portion 41 (see FIG. 1).

Figure 4:
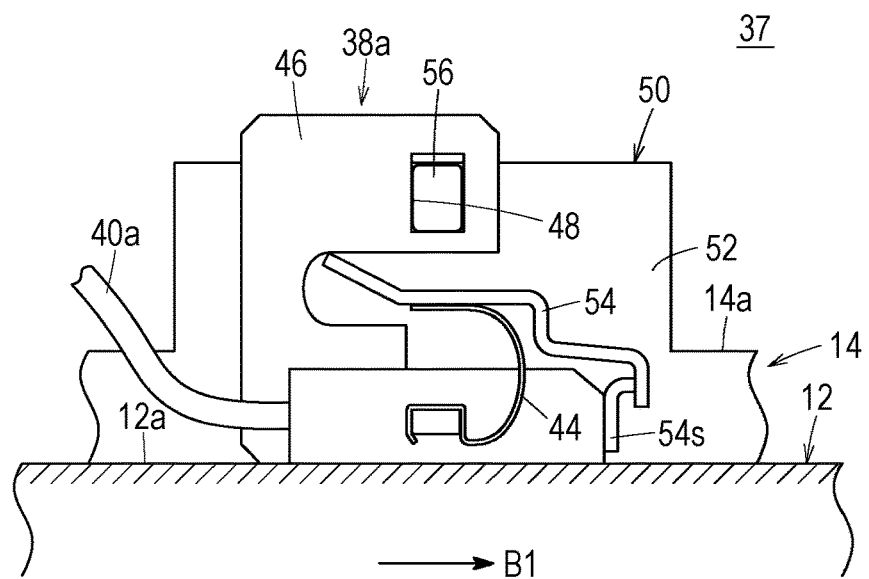
FIG. 4 is a front view for describing a temperature measuring component holding portion constituting the power storage module.

As illustrated in FIG. 4, the thermistor element 38a fixes one end of a spring 44. The other curved end is exposed to the outside. A planar portion 46 for holding the thermistor is provided in the thermistor element 38a, and an opening 48 is formed in the planar portion 46 in the stacking direction. Note that the thermistor elements 38b and 38c are configured in a similar manner to the thermistor element 38a.

The temperature measuring component holding portions 37 include temperature measuring component guide mechanisms (temperature measuring component guides) 50 that set the insertion direction of the thermistor elements 38a to 38c to a direction oriented towards the negative terminal 32b from the positive terminal 32a or a direction oriented towards the positive terminal 32a from the negative terminal 32b. As illustrated in FIGS. 3 and 4, the temperature measuring component guide mechanisms 50 include support plate portions 52 that are provided on the upper surfaces 14a of the separators 14. The support plate portions 52 extend in the arrow B direction and are provided so as to be integrated with corrugated plate portions 54.

For example, after being bent (curved) from the positive terminal 32a side towards the negative terminal 32b, each corrugated plate portion 54 extends in the horizontal direction and, after being further bent downwards about 90 degrees, extends in the horizontal direction. A stop portion 54s that abuts against the thermistor element 38a is formed at the tip of the corrugated plate portion 54 in an arrow B1 direction. The spring 44 comes in contact with the inner surface of the corrugated plate portion 54.

A projection 56 that protrudes in the stacking direction of the storage batteries 12 is formed in each support plate portion 52. The projection 56 being engaged with the opening 48 of the planar portion 46 fixes the thermistor element 38a to the temperature measuring component guide mechanism 50.

As illustrated in FIG. 3, cooling air passages 58 that circulate the cooling air between the terminal surfaces 12a of the storage batteries 12 and surfaces 12b that are on the opposite side with respect to the terminal surfaces 12a, in other words, cooling air passages 58 that circulate the cooling air along the principal surfaces 12s of the storage batteries 12, are formed between the separators 14 and the storage batteries 12.

As illustrated in FIG. 1, the thermistor elements 38a, 38b, and 38c are each disposed so as to correspond to a predetermined storage battery 12 of the storage battery bank 12M. The harnesses 40a, 40b, and 40c are disposed in the stacking direction of the storage batteries 12 and the lengths thereof in the staking direction are set according to the installed position of the thermistor elements 38a, 38b, and 38c.

As illustrated in FIGS. 1 and 2, the power storage module 10 includes a harness holder that is disposed so as to hold the harnesses 40a, 40b, and 40c and that covers some of the temperature measuring component holding portions 37. The harness holder is a terminal cover 60 that is disposed so as to cover the temperature measuring component holding portions 37 and the terminal surfaces 12a of the storage batteries 12 that have no thermistor elements 38a, 38b, and 38c mounted thereon.

Figure 5:
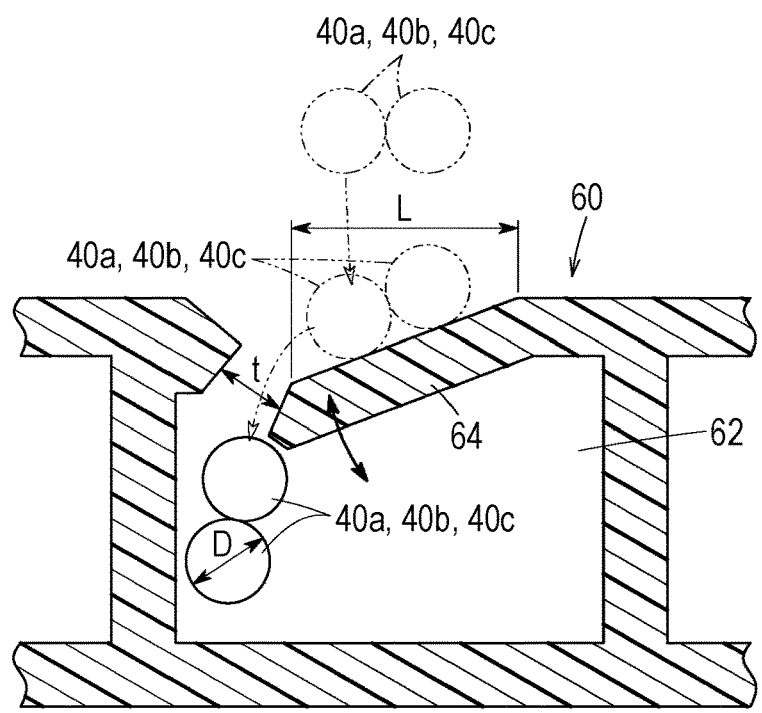
FIG. 5 is an explanatory drawing for describing a harness holding portion constituting the power storage module.

The terminal cover 60 is disposed so as to cover the entire upper surface of the storage battery bank 12M and forms openings 61a, 61b, and 61c at the installation positions of the thermistor elements 38a, 38b, and 38c. The terminal cover 60 includes a harness holding portion (a harness casing) 62 that accommodates the harnesses 40a, 40b, and 40c. As illustrated in FIG. 5, the harness holding portion 62 includes flexible lever portions (flexible levers) 64 that each include a gap t that is smaller than a diameter D of the harness 40a (40b and 40c).

With an application of external force, the flexible lever portion 64 becomes flexed and increases the gap t so that the gap t is equivalent to or larger than the diameter D of the harness 40a (40b and 40c). Each flexible lever portions 64 is inclined and a length L of the inclined portion is desirably set two times or more large than the diameter D. Note that the length of each of the flexible lever portions 64 may be set smaller than two times of the diameter D and each of the flexible lever portions 64 may not be inclined.

Work of mounting the thermistor 36 in the power storage module 10 configured in the above manner will be described below.

Due to the guiding function of the corrugated plate portion 54 constituting the temperature measuring component guide mechanism 50, as illustrated in FIGS. 3 and 4, the thermistor element 38a is inserted towards the negative terminal 32b side from the positive terminal 32a side. The thermistor element 38a abuts against and is supported by the stop portion 54s at the front end in the insertion direction, and the spring 44 is elastically supported by the inner surface of the corrugated plate portion 54 (see FIG. 4). Furthermore, the projection 56 being engaged with the opening 48 of the planar portion 46 fixes the thermistor element 38a to the temperature measuring component guide mechanism 50.

As illustrated in FIG. 5, the pair of harnesses 40a of the thermistor element 38a are urged against the flexible lever portion 64 of the corresponding terminal cover 60. The orientation of each of the harnesses 40a is changed so that the harnesses 40a roll along the inclination of the flexible lever portion 64 and the pair of harnesses 40a are aligned in the direction of gravity.

In the above state, when the harnesses 40a are further pushed in, the flexible lever portion 64 flexes downwards and the gap t is increased such that the harnesses 40a are received in the harness holding portion 62. Since the harnesses 40a are separated from the flexible lever portion 64, the flexible lever portion 64 returns upwards and the gap t is decreased. Accordingly, the harnesses 40a is prevented from being separated from the harness holding portion 62.

In the above case, in the first exemplary embodiment, as illustrated in FIG. 3, each temperature measuring component holding portion 37 is positioned between the corresponding positive terminal 32a and negative terminal 32b and is provided on the terminal surfaces 12a side. Accordingly, since the thermistor elements 38a, 38b, and 38c are each disposed between the corresponding positive terminal 32a and negative terminal 32b, each of the thermistor elements 38a, 38b, and 38c do not protrude to the outside on its own.

The positive terminals 32a and the negative terminals 32b are protruded portions with respect to the terminal surfaces 12a, and the thermistor elements 38a, 38b, and 38c are disposed between the protruded portions. With the above, the entire power storage module 10 can be configured in a simple and compact manner, and, advantageously, space can be saved easily.

Moreover, the insertion direction of each of the thermistor elements 38a, 38b, and 38c is set to a direction oriented towards the negative terminal 32b from the positive terminal 32a or a direction oriented towards the positive terminal 32a from the negative terminal 32b. Accordingly, work of detaching and attaching the thermistor elements 38a, 38b, and 38c is facilitated and work efficiency can be improved.

Furthermore, cooling air passages 58 that circulate the cooling air between the terminal surfaces 12a of the storage batteries 12 and surfaces 12b that are on the opposite side with respect to the terminal surfaces 12a, in other words, cooling air passages 58 that circulate the cooling air along the principal surfaces 12s of the storage batteries 12, are formed between the separators 14 and the storage batteries 12. Accordingly, the cooling air to the cooling air passages 58 being influenced by the existence or non-existence of the thermistor elements 38a, 38b, and 38c can be averted.

Furthermore, the harnesses 40a, 40b, and 40c provided in the thermistor elements 38a, 38b, and 38c are disposed in the stacking direction of the storage batteries 12. With the above, since the insertion direction of the thermistor elements 38a, 38b, and 38c and the direction in which the harnesses 40a, 40b, and 40c extend are orthogonal to each other, there is no interference between the above and installation work can be carried out effectively.

Furthermore, the terminal cover 60 is disposed so as to hold the harnesses 40a, 40b, and 40c and cover the temperature measuring component holding portions 37 on which the thermistor elements 38a, 38b, and 38c are not mounted. With the above, the thermistor elements 38a, 38b, and 38c can be prevented from being installed in the wrong position and temperatures of the selected storage batteries 12 of the storage battery bank 12M can be measured reliably.

Furthermore, the harness holder is the terminal cover 60 that is disposed so as to cover the terminal surfaces 12a of the plurality of storage batteries 12. Accordingly, there is no need to use an additional component and, therefore, is economical.

Figure 6:
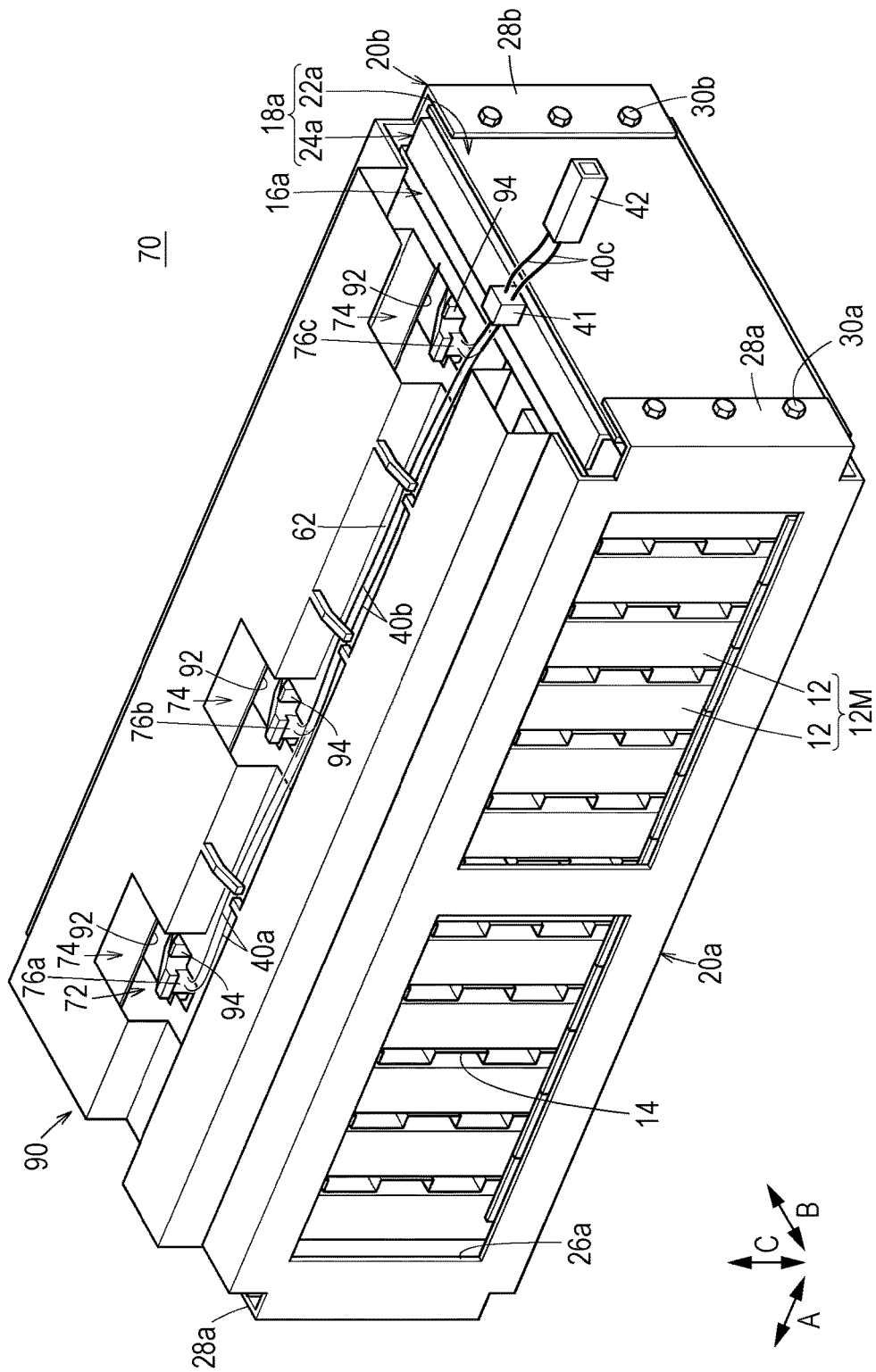
FIG. 6 is a schematic perspective view for describing a power storage module according to a second exemplary embodiment of the present disclosure.

FIG. 6 is a schematically illustrated perspective view for describing an essential portion of a power storage module 70 according to a second exemplary embodiment of the present disclosure. Note that components that are the same as those of the power storage module 10 according to the first exemplary embodiment will be attached with the same reference numerals and detailed description thereof is omitted.

Figure 7:
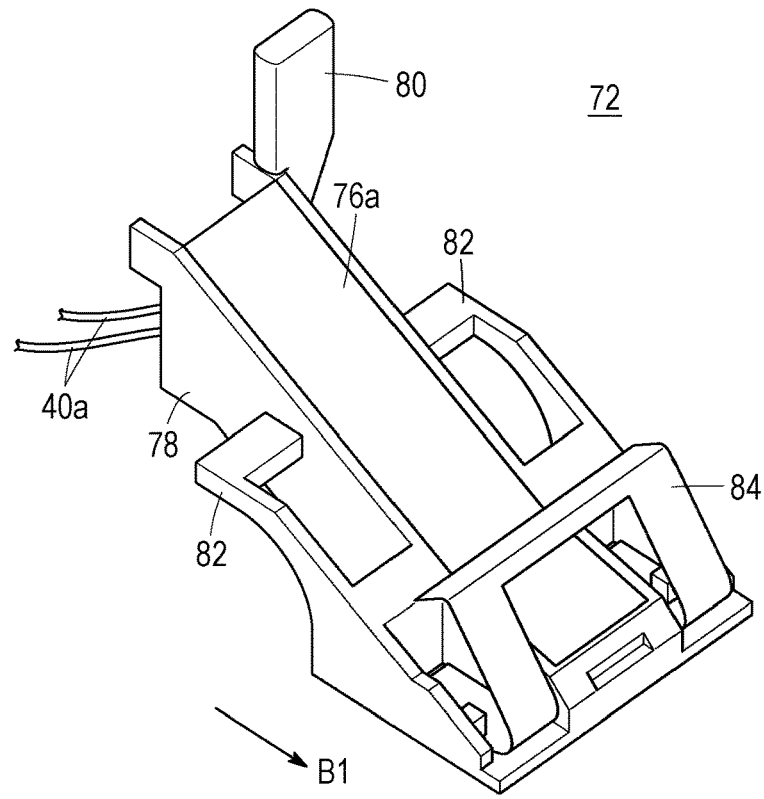
FIG. 7 is an explanatory perspective view for describing a thermistor element constituting the power storage module.
Figure 8:
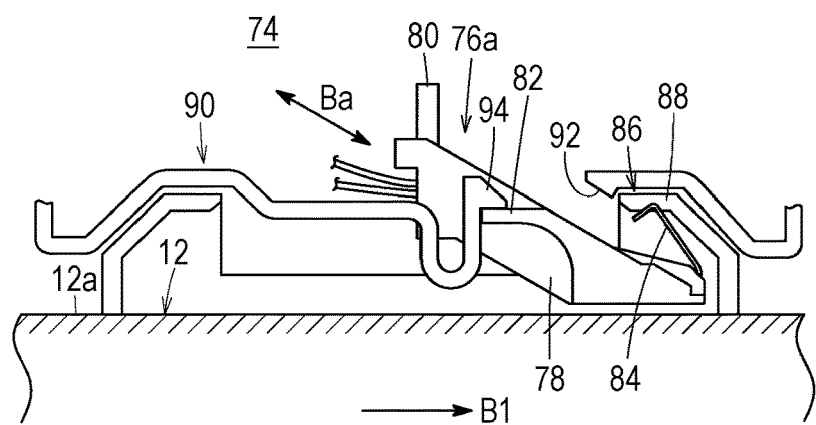
FIG. 8 is a front view for describing a temperature measuring component holding portion constituting the power storage module.

In the power storage module 70, a thermistor 72 is mounted on temperature measuring component holding portions 74. The thermistor 72 includes thermistor elements 76a, 76b, and 76c. As illustrated in FIGS. 7 and 8, the thermistor element 76a is provided with an inclination body portion 78 that is inclined upwards from a front end side in the insertion direction (the arrow B1 direction) towards the rear and is provided with a planar portion 80 on the upper rear portion of the inclination body portion 78.

A lock portion (a lock) 82 that protrudes towards the outside in the width direction are provided on each of the two sides of the inclination body portion 78. Each lock portion 82 has a tabular shape and extends in the horizontal direction. One end of a spring 84 is fixed to an end portion of the inclination body portion 78. The spring 84 extends so as to be folded over and inclined upwards, while the other end of the spring 84 is inclined downwards.

The temperature measuring component holding portions 74 include temperature measuring component guide mechanisms 86, and the temperature measuring component guide mechanisms 86 include support plate portions 88 that are provided on the upper surfaces 14a of the separators 14. Each spring 84 abuts against the corresponding support plate portion 88, and with the elastic force of each spring 84, the corresponding inclination body portion 78 is pressed downwards.

The power storage module 70 includes a terminal cover 90. As illustrated in FIG. 6, openings 92 are formed in the terminal cover 90 at positions where the thermistor elements 76a, 76b, and 76c are installed, and a pair of lock projections 94 that protrude towards the terminal surfaces 12a side of the storage batteries 12 are provided in each of the openings 92.

As illustrated in FIG. 8, the thermistor element 76a is configured so that the attachment and detachment direction thereof is a direction (an arrow Ba direction) that is inclined with respect to the corresponding temperature measuring component guide mechanism 86. Each of the lock projections 94 being engaged with the corresponding lock portions 82 fixes the thermistor elements 76a, 76b, and 76c.

The second exemplary embodiment configured in the above manner can obtain effects that are similar to those of the first exemplary embodiment described above.

The present disclosure relates to a power storage module that is provided with storage batteries and separators that are alternately stacked and that is provided with a temperature measuring component holding portion on which a temperature measuring component that measures the temperature of the storage batteries is mounted.

The storage batteries include terminal surfaces, each terminal surface provided with a positive terminal and a negative terminal, and the temperature measuring component holding portion is provided on a terminal surface side between the positive terminal and the negative terminal of the storage battery. The temperature measuring component holding portion includes a temperature measuring component guide mechanism that sets an insertion direction of the temperature measuring component to a direction oriented towards the negative terminal from the positive terminal or a direction oriented towards the positive terminal from the negative terminal.

Furthermore, cooling air passages that circulate cooling air between the terminal surfaces of the storage batteries and surfaces that are on an opposite side with respect to the terminal surfaces are preferably formed between the separators and the storage batteries.

Furthermore, a harness that is provided in the temperature measuring component is preferably disposed in a stacking direction of the storage batteries.

Furthermore, preferably, the power storage module includes a harness holder that holds the harness and that is disposed so as to cover some of the temperature measuring component holding portions.

Furthermore, the harness holder is preferably a terminal cover that is disposed so as to cover the terminal surfaces of the plurality of storage batteries.

Furthermore, preferably, the harness holder includes a harness holding portion that accommodates the harness. In such a case, preferably, the harness holding portion is provided with a flexible lever portion that forms a gap that is smaller than a diameter of the harness and that flexes upon application of an external force thereto such that the gap is increased so as to be equivalent to or larger than the diameter of the harness.

Furthermore, the temperature measuring component guide mechanism preferably includes an opening that is formed in a planar portion that is a portion of the temperature measuring component, and a projection that is provided on a separator side and that projects in a stacking direction of the storage batteries. In such a case, in a state in which the temperature measuring component is mounted on the temperature measuring component holding portion, preferably, the projection being engaged with the opening fixes the temperature measuring component.

Furthermore, the temperature measuring component guide mechanism preferably includes a tabular lock portion that is a portion of the temperature measuring component, and a lock projection that is provided on a separator side and that projects towards a terminal surface side of the storage batteries. In such a case, in a state in which the temperature measuring component is mounted on the temperature measuring component holding portion, preferably, the lock projection being engaged with the lock portion fixes the temperature measuring component.

According to the present disclosure, the temperature measuring component holding portion is provided on a terminal surface side between the positive terminal and the negative terminal. Accordingly, since the temperature measuring component is disposed between the positive terminal and the negative terminal, the temperature measuring component do not protrude to the outside on its own. The positive terminal and the negative terminal are protruded portions with respect to the terminal surface, and the temperature measuring component is disposed between the protruded portions. With the above, the power storage module can be configured in a simple and compact manner and space can be saved easily.

Moreover, the insertion direction of the temperature measuring component is set to a direction oriented towards the negative terminal from the positive terminal or a direction oriented towards the positive terminal from the negative terminal. Accordingly, work of detaching and attaching the temperature measuring component is facilitated and work efficiency can be improved.

Obviously, numerous modifications and variations of the present invention are possible in light of the above teachings. It is therefore to be understood that within the scope of the appended claims, the invention may be practiced otherwise than as specifically described herein.

What is claimed is:

1. A power storage module, comprising:
   storage batteries;
   separators that are stacked alternately with the storage batteries;
   a temperature measuring component that measures a temperature of a storage battery of the storage batteries;
   temperature measuring component holding portions, the temperature measuring component being mounted on a first temperature measuring component holding portion of the temperature measuring component holding portions;
   a terminal cover having an opening extending through the terminal cover at a side surface of the terminal cover at which the first temperature measuring component holding portion is disposed; and
   a harness connected to the temperature measuring component, wherein
   the storage batteries include terminal surfaces, each terminal surface provided with a positive terminal and a negative terminal, a first terminal surface of the terminal surfaces being covered by the terminal cover,
   the first temperature measuring component holding portion is provided on a terminal surface side between the positive terminal and the negative terminal of the storage battery,
   a temperature measuring component guide mechanism is further provided that sets an insertion direction of the temperature measuring component to a direction oriented towards the negative terminal from the positive terminal or a direction oriented towards the positive terminal from the negative terminal, and
   the temperature measuring component and the harness form a connected unit that extends through the opening at the side surface of the terminal cover at which the first temperature measuring component holding portion is disposed so that the connected unit extends through the opening at a position below an uppermost surface of the terminal cover.

2. The power storage module according to claim 1, wherein
cooling air passages that circulate cooling air between the terminal surfaces of the storage batteries and surfaces that are on an opposite side with respect to the terminal surfaces are formed between the separators and the storage batteries.

3. The power storage module according to claim 1, wherein
the harness has a portion that extends in a stacking direction of the storage batteries.

4. The power storage module according to claim 3, wherein
the terminal cover holds the harness such that a portion of the terminal cover is disposed between the harness and respective ones of the storage batteries, the terminal cover being disposed so as to cover some of the temperature measuring component holding portions.

5. The power storage module according to claim 4, wherein
the terminal cover is disposed so as to cover the terminal surface of each of the storage batteries.

6. The power storage module according to claim 4, wherein
the terminal cover includes a harness holding portion that accommodates the harness, and
the harness holding portion is provided with a flexible lever portion that forms a gap that is smaller than a diameter of the harness and that flexes upon application of an external force thereto such that the gap is increased so as to be equivalent to or larger than the diameter of the harness.

7. The power storage module according to claim 1, wherein
the temperature measuring component guide mechanism includes
an opening that is formed in a planar portion that is a portion of the temperature measuring component, and
a projection that is provided on a separator side and that projects in a stacking direction of the storage batteries, and
in a state in which the temperature measuring component is mounted on the temperature measuring component holding portion, the projection is engaged with the opening to fix the temperature measuring component.

8. The power storage module according to claim 1, wherein
the temperature measuring component guide mechanism includes
a tabular lock portion that is a portion of the temperature measuring component, and
a lock projection that is provided on a separator side and that projects towards a terminal surface side of the storage batteries, and
in a state in which the temperature measuring component is mounted on the temperature measuring component holding portion, the lock projection is engaged with the lock portion to fix the temperature measuring component.

9. The power storage module according to claim 1, wherein
the terminal cover covers the positive terminal and the negative terminal of the first storage battery.

10. The power storage module according to claim 1, wherein
the harness extends from the temperature measuring component.

11. The power storage module according to claim 10, wherein
the connected unit formed by the connected temperature measuring component and the harness extends through the opening of the terminal cover to an outside of the terminal cover with respect to an inside of the terminal cover which faces the first terminal surface, and
the terminal cover includes a harness holding portion in which the harness extends in a stacking direction of the storage batteries along the outside of the terminal cover.

12. The power storage module according to claim 1, wherein
the connected unit extends through the opening in a direction that crosses a stacking direction of the storage batteries.

13. A power storage module, comprising:
storage batteries stacked in a stacking direction, each of the storage batteries comprising:
a terminal surface; and
a positive terminal and a negative terminal which are provided on the terminal surface;
separators stacked alternately with the storage batteries in the stacking direction;
a temperature measuring component to measure a temperature of a measured storage battery among the storage batteries;
a temperature measuring component holder provided on a terminal surface side of the measured storage battery between the positive terminal and the negative terminal of the measured storage battery to hold the temperature measuring component, the temperature measuring component holder comprising:
a temperature measuring component guide via which the temperature measuring component is inserted into the temperature measuring component holder in a direction from the positive terminal toward the negative terminal or in a direction from the negative terminal toward the positive terminal;
a terminal cover that covers the terminal surface of a first storage battery of the storage batteries and has an opening that extends through the terminal cover at a side surface of the terminal cover at which the temperature measuring component holder is disposed; and
a harness connected to the temperature measuring component to form a connected unit that extends through the opening at the side surface of the terminal cover so that the connected unit extends through the opening at a position below an uppermost surface of the terminal cover.

14. The power storage module according to claim 13, wherein
a cooling air passage to circulate cooling air between the terminal surface of the first storage battery and a surface that is on an opposite side with respect to the terminal surface is provided between a first separator among the separators and the first storage battery, the first separator and the first storage battery being adjacent to each other.

15. The power storage module according to claim 13, wherein
the harness has a portion that extends in the stacking direction of the storage batteries such that a portion of the terminal cover is disposed between the harness and respective ones of the storage batteries.

16. The power storage module according to claim 15, further comprising a second temperature measuring component holder provided on a terminal surface side of a second measured storage battery among the storage batteries between the positive terminal and the negative terminal of the second measured storage battery to hold the temperature measuring component, the second temperature measuring component holder comprising:

a second temperature measuring component guide via which the temperature measuring component is inserted into the second temperature measuring component holder in a direction from the positive terminal toward the negative terminal or in a direction from the negative terminal toward the positive terminal, wherein the terminal cover holds the harness and is disposed so as to cover the second temperature measuring component holder.

17. The power storage module according to claim 16, wherein the terminal cover is disposed so as to cover the terminal surface of each of the storage batteries.

18. The power storage module according to claim 16, wherein the terminal cover includes a harness casing to accommodate the harness, and the harness casing is provided with a flexible lever that provides a gap that is smaller than a diameter of the harness and that flexes upon application of an external force thereto such that the gap is increased so as to be equivalent to or larger than the diameter of the harness.

19. The power storage module according to claim 18, wherein a part of the flexible lever is inclined, and a length of the part is set at least two times as large as the diameter of the harness.

20. The power storage module according to claim 13, wherein the temperature measuring component guide includes an opening that is provided in a planar portion that is a portion of the temperature measuring component, and a projection that is provided on a separator side and that projects in the stacking direction of the storage batteries, and in a state in which the temperature measuring component is mounted on the temperature measuring component holder, the projection is engaged with the opening to fix the temperature measuring component.

21. The power storage module according to claim 13, wherein the temperature measuring component guide includes a tabular lock that is a portion of the temperature measuring component, and a lock projection that is provided on a separator side and that projects towards a terminal surface side of the storage batteries, and in a state in which the temperature measuring component is mounted on the temperature measuring component holder, the lock projection is engaged with the tabular lock to fix the temperature measuring component.

22. The power storage module according to claim 13, wherein the temperature measuring component includes a thermistor element.

23. The power storage module according to claim 13, wherein the terminal cover covers the positive terminal and the negative terminal of the first storage battery.

24. The power storage module according to claim 13, wherein the harness extends from the temperature measuring component.

25. The power storage module according to claim 24, wherein the connected unit formed by the connected temperature measuring component and the harness extends through the opening of the terminal cover to an outside of the terminal cover with respect to an inside of the terminal cover which faces the terminal surface of the first storage battery, and the terminal cover includes a harness holding portion in which the harness extends in the stacking direction of the storage batteries along the outside of the terminal cover.

26. The power storage module according to claim 13, wherein the connected unit extends through the opening in a direction that crosses a stacking direction of the storage batteries.

* * * * *